United States Patent
Conklin et al.

[11] Patent Number: 5,991,881
[45] Date of Patent: *Nov. 23, 1999

[54] NETWORK SURVEILLANCE SYSTEM

[75] Inventors: David Allen Conklin, San Antonio, Tex.; John Reed Harrison, Palm Bay, Fla.

[73] Assignee: Harris Corporation, Melbourne, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/744,848

[22] Filed: Nov. 8, 1996

[51] Int. Cl.$^6$ .................................................. G06F 11/00
[52] U.S. Cl. ............................................ 713/201; 380/25
[58] Field of Search .............................. 395/186, 187.01, 395/188.01, 182.02, 183.19; 707/9; 711/163, 164; 370/242, 252, 259; 380/4, 49; 714/201, 200, 202, 2, 4; 364/286.4, 286.5; 382/118, 119

[56] References Cited

U.S. PATENT DOCUMENTS

| | | |
|---|---|---|
| 5,414,833 | 5/1995 | Hershey et al. .......................... 395/575 |
| 5,440,688 | 8/1995 | Nishida .............................. 395/182.02 |
| 5,475,625 | 12/1995 | Glaschick . |
| 5,483,658 | 1/1996 | Grube et al. . |
| 5,557,742 | 9/1996 | Smaha et al. . |
| 5,568,471 | 10/1996 | Hershey et al. .......................... 370/17 |
| 5,621,889 | 4/1997 | Lermuzeaux et al. . |
| 5,872,912 | 2/1999 | Brownmiller et al. ............ 395/184.01 |

*Primary Examiner*—Robert W. Beausoliel, Jr.
*Assistant Examiner*—Nadeem Iqbal
*Attorney, Agent, or Firm*—Joel I. Rosenblatt

[57] ABSTRACT

This is a system and method for network surveillance and detection of attempted intrusions, or intrusions, into the network and into computers connected to the network. The System functions are: (A) intrusion detection monitoring, (B) real-time alert, (C) logging of potential unauthorized activity, and (D) incident progress analysis and reporting. Upon detection of any attempts to intrude, the System will initiate a log of all activity between the computer elements involved and send an alert to a monitoring console. When a log is initiated, the network continues to be monitored by a primary surveillance system. A secondary monitoring process is started which interrogates the activity log in real-time and sends additional alerts reporting the progress of the suspected intruder.

34 Claims, 6 Drawing Sheets

NETWORK SURVEILLANCE COMPONENT DIAGRAM

FIGURE 1 – NETWORK SURVEILLANCE COMPONENT DIAGRAM

INTRUSION DETECTION PROCESS

NETWORK SURVEILLANCE SYSTEM

MICROFICHE APPENDIX

A Microfiche Appendix having 7 microfiche and 1,284 frames are attached as an appendix to this application. The microfiche is a listing of the computer program used in the preferred embodiment to practice the invention according to the inventive principles.

SUMMARY OF THE INVENTION

This invention relates to systematic monitoring, intrusion identification, notification, and tracking of unauthorized activities, such as methods or systems used by "hackers" to intrude into computer networks. Technologies for network security monitoring have generally been limited to detection and notification capabilities. More sophisticated systems utilize specific and limited hardware and software configurations to deny access upon detection of recognizable unauthorized activities.

The use of computer networks and on-line services makes useful a security system which can not only detect unauthorized activities but can also track, record, and report on intrusion activities for evidence of theft or misuse of electronically stored property. Such a system is improved by being easily integrated into existing network management systems to provide centralized monitoring capabilities.

It is also desirable for a system of this nature to be inaccessible or independent of any other network attached or monitored device. For example, by analogy, a hidden surveillance camera in a hallway, triggered by motion, will collect information and record activities regardless of whether or not the doors which provide access to the hallway are locked.

There are other features of a Network Surveillance System, as disclosed, which are useful for large or small network environments. For example, once the System is configured, the System should immediately start surveillance functions. It should work in a stand-alone mode as well as a dependent or monitored mode. It should continuously report on all pertinent activities following detection of a predefined alert situation. It should automatically use means to avoid system overload conditions such as excessive logging or recording. It should require no human monitoring other than a response to Alert/Notification conditions. It should automatically keep records of vital alarm information. It should provide high reliability, operational security, and speed. It should not adversely affect network performance; and it should be economical.

The need for systems to provide network-based intrusion detection, collect evidence and report progress of ensuing intrusion activities, has been driven by the escalating number of reported and unreported network and computer intrusions. This System according to the inventive principles, provides: (a) real-time alert/notification of unauthorized network activity, (b) a broad range of predefined unauthorized "triggers" and is easily improved as new triggers are defined, (c) evidence collection from the point of intrusion recognition through to manual termination or time out, (d) graphical and textual representation of all alarms and notifications, (e) continuous updates of the progress of a monitored activity, (f) user-configurable detection profiles, (g) stand-alone network surveillance functionality, as well as modular integration for sending alert/notification data via a data network to centralized network management systems.

This System is transparent to the intruder, as it has no discernible address. It is configured to receive all data on the network and cannot be accessed by a hacker or intruder. Accordingly, the authenticity of the records made by the System are not accessible to unauthorized persons, is preserved for evidentiary use.

DESCRIPTION OF THE INVENTION

Figure 1:
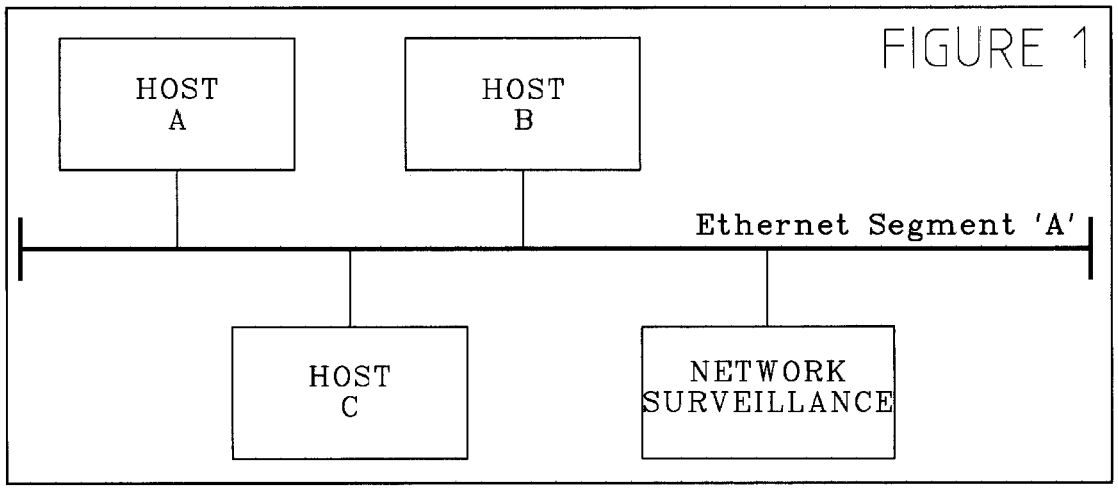
FIG. 1 shows in, schematic form, a network system employing computer hosts A, B, and C, and a Network Surveillance System connected to a network segment such as an Ethernet Segment A.

The system performs network surveillance, as described above, by monitoring the communications on a network or on a particular segment of the . network. For example, all communications between an Ethernet Segment 'A' Host A and Host C, as shown in FIG. 1, are broadcast on the Ethernet segment. The Network Surveillance system captures all traffic broadcast on the segment and therefore includes the communications between Host A and Host C.

Figure 3:
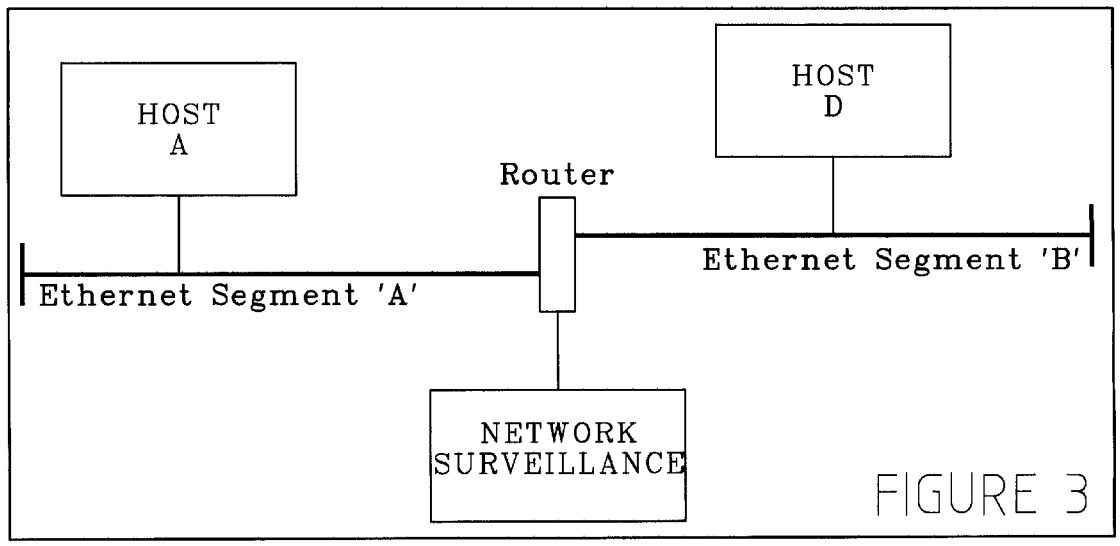
FIG. 3 shows a system similar to the system of FIG. 1 connected to two network segments, such as Ethernet Segment A and Ethernet Segment B, connected by a Router, and with the Network Surveillance System connected to Segment A and to Segment B through the Router.

In larger environments, as shown in FIG. 3, a network may be a collection of Ethernet segments connected by gateways or routers. There can be network communication that occurs across segments, where Host A may communicate with Host D on a Segment B other than the one Host A resides on. In this case, traffic is broadcast and the Network Surveillance System will capture all data on Segments A and B.

Figure 2:
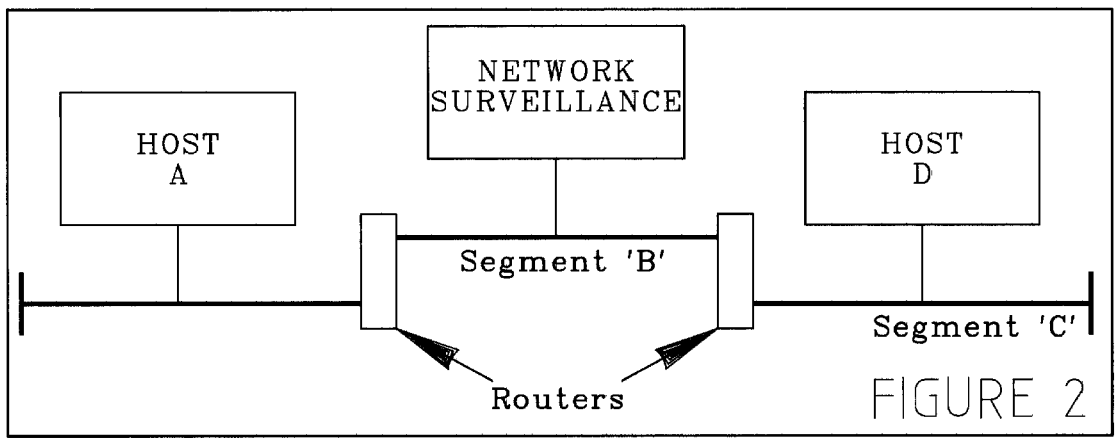
FIG. 2 shows a system similar to FIGS. 1 and 2, with three network segments, A, B, and C, connected by Routers and with the Network Surveillance System connected to each of the segments by connection to Segment B and to the other two segments through the Routers.

A third case is where the Network Surveillance System is connected to a Segment B, as shown in FIG. 2, connecting two other segments, A and C. In this case the Host A on Segment A may be communicating with Host D on Segment C, which is interconnected across intermediate Segment B.

Figure 5:
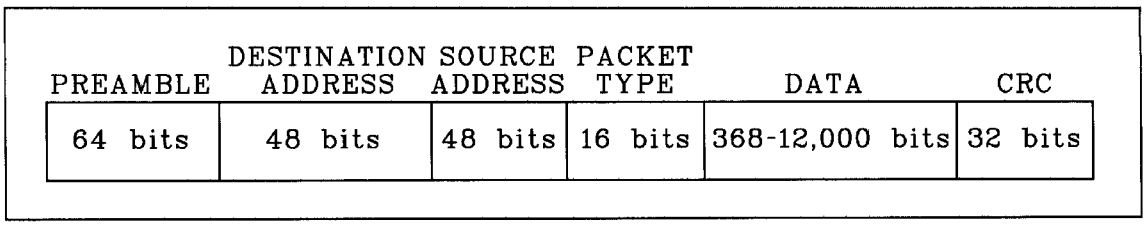
FIG. 5 shows the invention's use of the Transmission Control Protocall/Internet Protocol (TCP/IP) Standard with an example of network data packetized in ethernet frames.

This Network Surveillance System is designed and intended to operate compatibly on networks which communicate using the Transmission Control Protocol/Internet Protocol (TCP/IP) standard as shown in FIG. 5. Network data is packetized, as shown in FIG. 5, and sent in frames which are structured to be compatible with any network device which complies with the TCP/IP standards. Each frame or packet transmitted across the Ethernet contains a preamble, destination address, source address, type field, data field, and a cyclical redundancy check (CRC). The preamble contains data used by the communicating computer systems to synchronize or handshake. Destination and source Internet Protocol (IP) addresses represent the principals communicating and the packet type indicates the type of communication (i.e. E-Mail, ftp, www, telnet, etc.). The data field contains the actual information content of the dialogue. The CRC is an integrity check facilitated between the two systems participating in the conversation.

The invention uses components acting together to provide system functionality. System requirements for operation of the Network Surveillance System are a computer system with a fully multi-tasking operating system, a network interface card, and network surveillance software. This combination of hardware and software attached to a TCP/IP network will perform the processes described below.

The software program listings for the Network Surveillance System, as described in this application, is attached as a Microfiche Appendix. It should be understood that the inventive principles described in this application are not limited to the software listings shown in the microfiche appendix or to components or configurations described in this application. It should be understood that the principles, concepts, systems, and methods shown in this application may be practiced with software programs written differently from the programs shown in the microfiche appendix, or the different configurations, or different equipment than is described in this application without departing from the principles of the invention shown as a Network Surveillance System.

Figure 4:
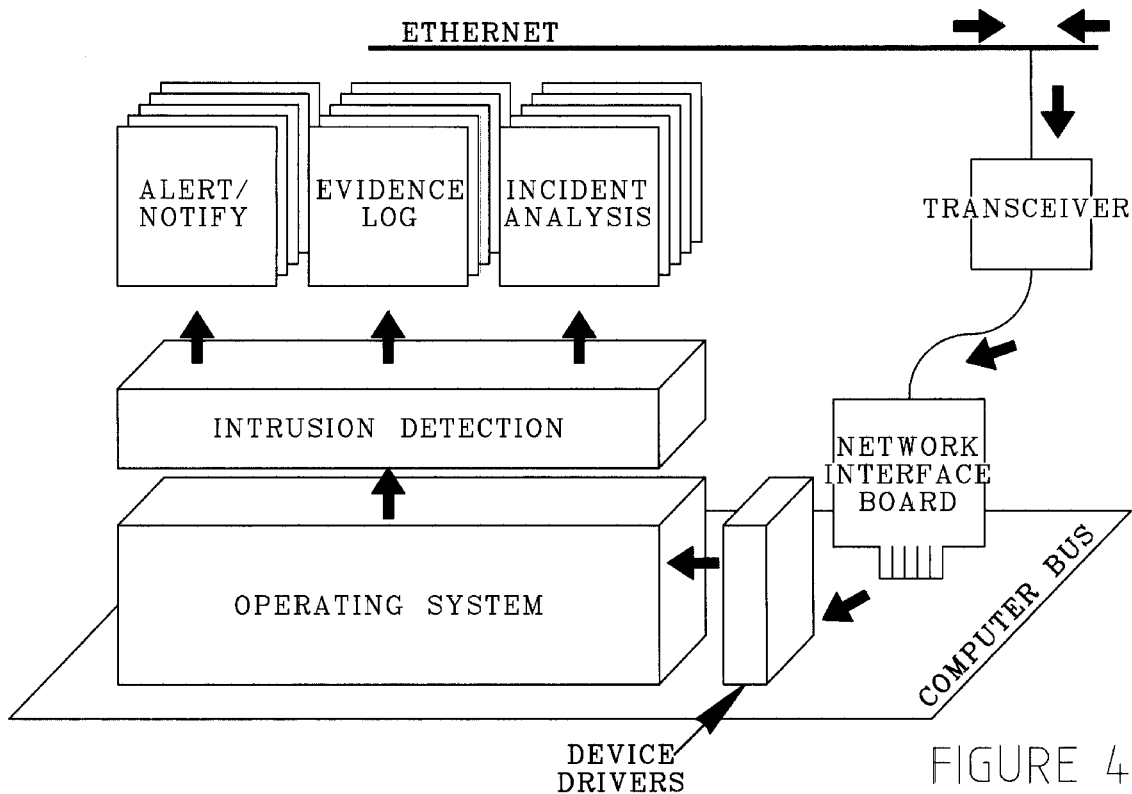
FIG. 4 shows in block form the Network Surveillance System in FIGS. 1, 2, and 3, connected to a network such as on Ethernet.

As shown schematically in block form in FIG. 4, the Intrusion Detection portion of the Network Surveillance System, detecting an attempted intrusion or an intrusion, operates responsively to network data and passes its response to the functional parts of the Network Surveillance System shown in FIG. 4 as Incident Analysis, Evidence Log, and Alert Notify functions.

The Network Surveillance System operates through a computer, attached to the network, in the preferred embodiment by an interface card, as shown in FIG. 5. In the preferred embodiment, as shown in FIG. 4, the network interface card contains a preset and unique identifier known as an Ethernet address or hardware address. The unique address, provides the means for an attached computer system to identify intended packets and ignore the rest, as is well known in the art. The Network Surveillance System utilizes standard device drivers to forward all packets into the host from the network regardless of the address in the packets. This is generally known in a UNIX-based operating system as running in "promiscuous mode," as is well known in the art.

This promiscuous mode makes the System transparent and inaccessible to an intruder and preserves the authenticity of the logged entries mode by the System.

This promiscuous mode provides the means to listen to the network traffic in its entirety. Upon receipt of the network packets the interface card passes the packet and all data contained within to the operating system of the Network Surveillance System computer. Once there, it is stored in memory awaiting entry to the next phase which is the Intrusion Detection process, described below.

The computer equipment configuration which may be used in the preferred embodiment may be, for example, a Sun Sparc 20 computer running the Sun Solaris 2.5 operating system, available as commercial-off-the-shelf products as known to one skilled in the art.

The system and method and Network Surveillance according to the inventive principles shown as defined in FIG. 4.

Figure 6:
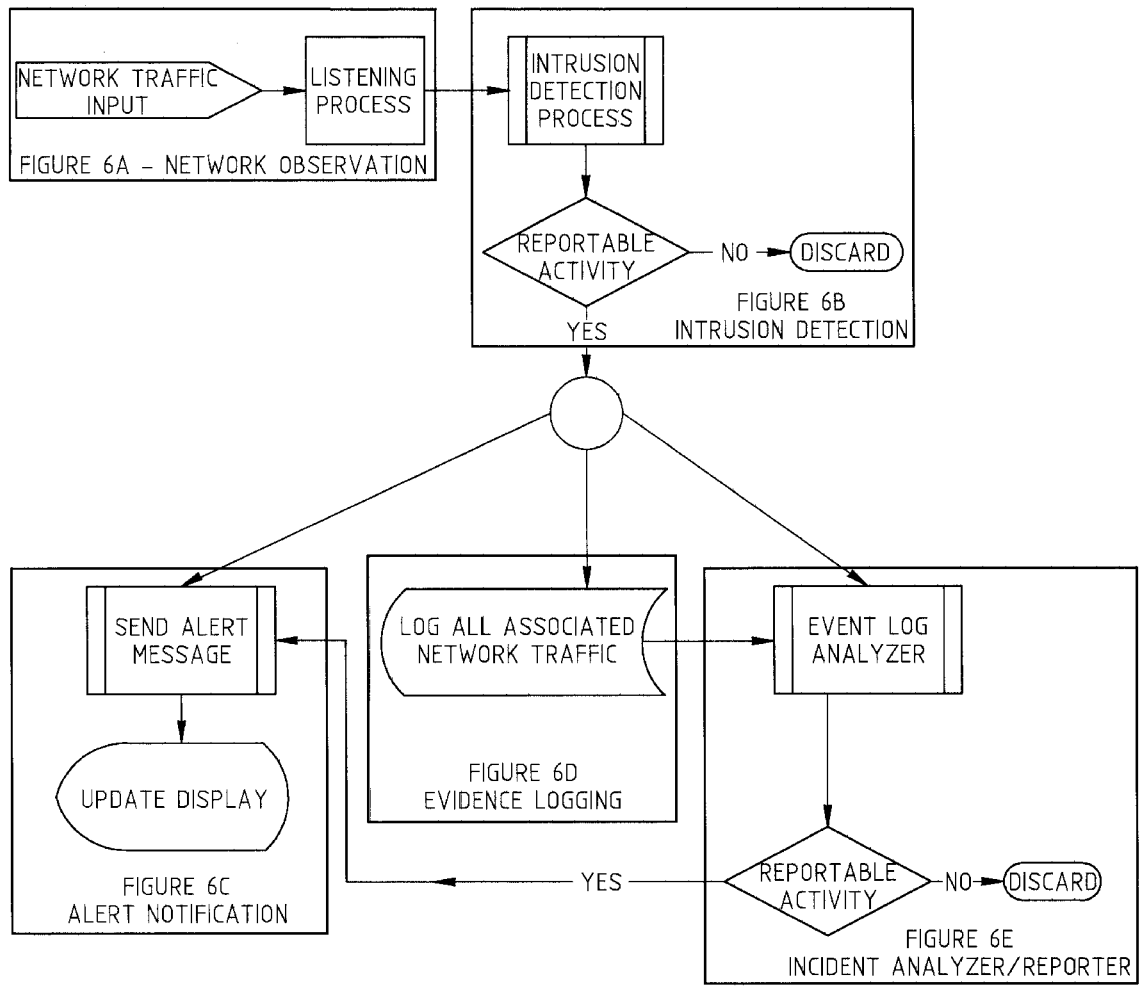
FIG. 6 shows in block form informational flow in the Network Surveillance System in its functions of monitoring intrusions, providing alerts, logging intrusions, and providing event log analyzing.

An overview of the systems major components are shown in FIG. 6, which provide the following functionality for the System. The Network Observation Function shown in FIG. 6a, including the listening Process to the Network Traffic Input, the Intrusion Detection Process, shown in FIG. 6b responds to attempted intrusions by providing indications of any such intrusion to the Evidence Logging function shown in FIG. 6d as a Reportable Activity. The Evidence Logging function responds to the Reportable Activity from the Intrusion Detection function and that Evidence Logging Function responsively writes a log of the associated network traffic and provides a responsive indication to the Incident Analyzer/Reporter shown in FIG. 6e and its Event Log Analyzing function. The Incident Analyzer/Reporter is used to provide indications of Reportable Activity to the Alert Notification function shown in FIG. 6c which is responsive to those indications and to indications from the Intrusion Detection function is shown in FIG. 6b. The Alert Notification Function, shown in FIG. 6c provides Alert Messages and Updates a Display providing alert messages.

Network Observation Function

By observing the Network Traffic Input, data is collected by the Listening Process and sent to the Intrusion Detection function where patterns and content are examined. In the preferred embodiment, this Intrusion detection Process function is by comparison. However, as understood by those skilled in the art, the inventive principles are not limited to a comparison method for detecting intrusions. In the continuous process of the preferred embodiment, all network communications are gathered and forwarded to the "Intrusion Detection function" for further scrutiny. Similar to the analogous security camera positioned in a hallway or room, this is the basic mechanism for data collection which will drive the functions for the components identified in FIG. 6, as component parts of the System.

Intrusion Detection Function

Intrusion Detection may incorporate algorithms or patterns to detect attempted intrusions or intrusions on the network. As each packet of network data is passed from the Network Observation function, the Intrusion Detection function examines the data in comparison to a series of pre-defined or learned patterns which are pre-stored or developed from data received from the network.

In the preferred embodiment, the network data is compared to a database of known patterns. If the collected data matches the databases stored data, individually or collectively, then the Network Surveillance System identifies the network data as a reportable activity and the Network Surveillance System components shown in FIG. 6c, 6d, and 6e are activated and a data channel is opened between the Network Observation function shown in FIG. 6a and the Evidence Logging function, as follows.

In the process of network surveillance, network specific characteristics or facts may be developed from the network data collection over time and stored in the in a database. For example, certain network traffic facts or characteristics can become measurably predictable such as time of day, number and types of packets, common destination/source address combinations, etc. The Intrusion Detection function producing the record in the Evidence Logging function may use artificial intelligence techniques as known to those skilled in the art, to compare network data against algorithms or patterns the surveillance system has acquired or developed or identified as normal. If network traffic is deemed outside of normal tolerances for measured characteristics, then the Intrusion Detection will activate the Alert Notification, Evidence Logging, and Incident Analyzer Reporter, functions as described below.

This Intrusion Detection function may be modified to allow customized triggers to be entered by system administrators. This functionality provides for the alert notification of events deemed important or suspicious by the individual administering the system.

Accurate detection and identification of suspicious network activities is the goal of the Network Surveillance System's Intrusion Detection function. This Function provides an interactive series of events which deliver a chronological record analogous to observing a crime on hidden camera and enhances that detection and identification process.

Intrusion Detection—Reportable Activity

If, there is no indication of an actual or potential intrusion, then the examined packet data is discarded. When a packet or accumulation of packets match a predefined intrusion profile the Intrusion Detection function identifies the network traffic as a reportable activity will construct a data structure which contains a date/time stamp indicating the time of detection, the source and destination Internet Protocol (IP) addresses, an assigned message identifying the event detected. This data structure is passed to the Alert Notification function for processing. When a positive identification of a reportable activity occurs, the entire triggering packet(s) may be written to a log file created in the Evidence Logging function. This log file is then used to hold all ensuing packets associated with this reportable activity event by any one of its identifiable characteristics. For example, the log file written is named using the date/time and name of event detected. The source Internet Process (IP) address is sent to the Evidence Logging function as a controlling parameter so that a secondary logging function may be started which will only capture packets to and from the IP address identified as the source of the intrusion or attack.

Alert Notification Function

This Function is the first in a sequence of events which occur immediately following detection of reportable activity indicating an unauthorized event or series of events indicating an unauthorized activity on a network segment. Characteristics of the reportable activity such as an attempted intrusion, which may be called an attack, are encapsulated into an alarm message called a Send Alert message which is also date/time stamped. In the preferred embodiment, the Send Alert Message is formatted into data structures, updates the stand-alone system console, or is transmitted using IEEE standard Simple Network Management Protocol (SNMP) data packets referred to as Trap PDUs (protocol data units in the preferred embodiment) to a network management system, depending on current Network Surveillance System system configuration.

SNMP Implementation

A Trap PDU is issued by an SNMP enabled software application. It is used to provide the remote SNMP-based network management station with an asynchronous notification of some significant event. The following is the field definition of a Trap PDU:

PDU type: indicates a GetRequest PDU,
enterprise: identifies the system that generated the trap,
agent-address: IP address of the object generating the trap,
generic-trap: one of the predefined trap types,
specific-trap: a code that indicates more specifically the nature of the trap,
time-stamp: time of the generation of the trap, and
variable-bindings: implementation specific information relating to the trap.

Responses to an attack include a description of the identified event with the attacking network address, targeted network address and a date/time stamp. This information is sent to the local system console by default but can be configured to send to any number of remote SNMP monitoring systems. The system can also be configured to transmit all message data contained within the Trap PDU in encrypted (using the Data Encryption Standard—DES in the preferred embodiment) format to the remote monitoring systems.

Evidence Logging Function

This Function records the activities after an intrusion or attack is detected. It is this Function, as a transparent unknown third party to the intruder, which records all subsequent events following an attack or a suspected computer break-in. Collection of data by this function without any identifiable address for the Systems, preserves the collected data's authenticity.

These attack events could possibly include attempts to or actual removal of files or programs from, or placement of files onto, or unauthorized execution of programs on the compromised computer system. Many intruders try to cover their tracks by deleting logged Network Traffic evidence of their activities on the system broken into.

The System continuously records associated network traffic and provides a record of each action taken by the attacker or intruder including attempts to cover tracks. This evidential data will have greater integrity than that of the compromised system because it is separate and not subject to intrusion by an intruder attacker. Third party evidence logging provides reliable data for determining appropriate response activities, such as restoring lost data, removing unauthorized programs, or disconnecting the system from the network temporarily.

The functionality provided by the Evidence Logging component is as follows:

After the Intrusion Detection component is triggered, the Evidence Logging component is activated by:

initiating a duplicate Listening Process in the Network Observation Function, dedicated to recording packets containing the suspected attacking host's IP address or other characteristic identifying the intrusion or attempted intrusion. The originating IP addressed is passed from the Intrusion Detection component upon detection.

creating an event log file named by using a concatenation of the date/time and name of event detected writing the stored packet or packets which caused the event log to be triggered writing all ensuing packets originating from the attacking IP address into the log as they are encountered continuous logging until no packets are written for a predetermined period of time, or until the process is manually stopped Incident Analyzer Function Event Log Analyzer A third function upon detection of an unauthorized event on the network may be the monitoring and reporting on activities recorded in the Evidence Logging Function, in real-time. Secondary alarms as a Reportable Activity responsive to the Event Log Analyzer, are sent through the same alert notification facility which the original alarm was sent. Timely notification of these events improves the System Administrator's ability to effectively react to intrusion incidents. This reporting provides an ongoing narrative on the progress of the attempted intrusion. For example, if network data shows that the attacker started a second attack on another network system, such as another computer, then the Incident Analyzer may command or instruct the Network Surveillance System Evidence Logging Function to start a log to collect all network traffic between the attacking system and the new target system as well and continue to report on activities on the first attacked system.

Reportable Activity

As events occur and are recorded into the appropriate log file, the Event Log Analyzer will continuously function to identify and impute an identifier to the event. Once the event is identified, it is then communicated by the same SNMP data structures used to communicate the original detection alert to the console or a SNMP-based network management server. If the events cannot be accurately identified the Analyzer will skip to the next log record.

For example, where a computer system is entered without authority, the intrusion will be recognized by the Network Surveillance System, an alert message sent, and the evidence log will be recording all network packets to and from the suspected host computer. From this time, every command issued from the suspected host to the targeted system is recorded producing a chronological record for later inspection. The Event Log Analyzer will function to read each recorded data packet from the log file and attempts to identify representative actions which the packets embody. If the intruder enters any commands once this evidence capturing function is activated, the Event Log Analyzer will interpret the commands from the records and pass the data to the Alert Notification function for broadcast.

The Incident Analyzer provides an ability to shadow an attacker and report by discernible characteristics or anomalous occurrences. This unique aspect of the invented methodology is what differentiates it from simpler detect and alert logging categories of intrusion detection systems.

Figure 7:
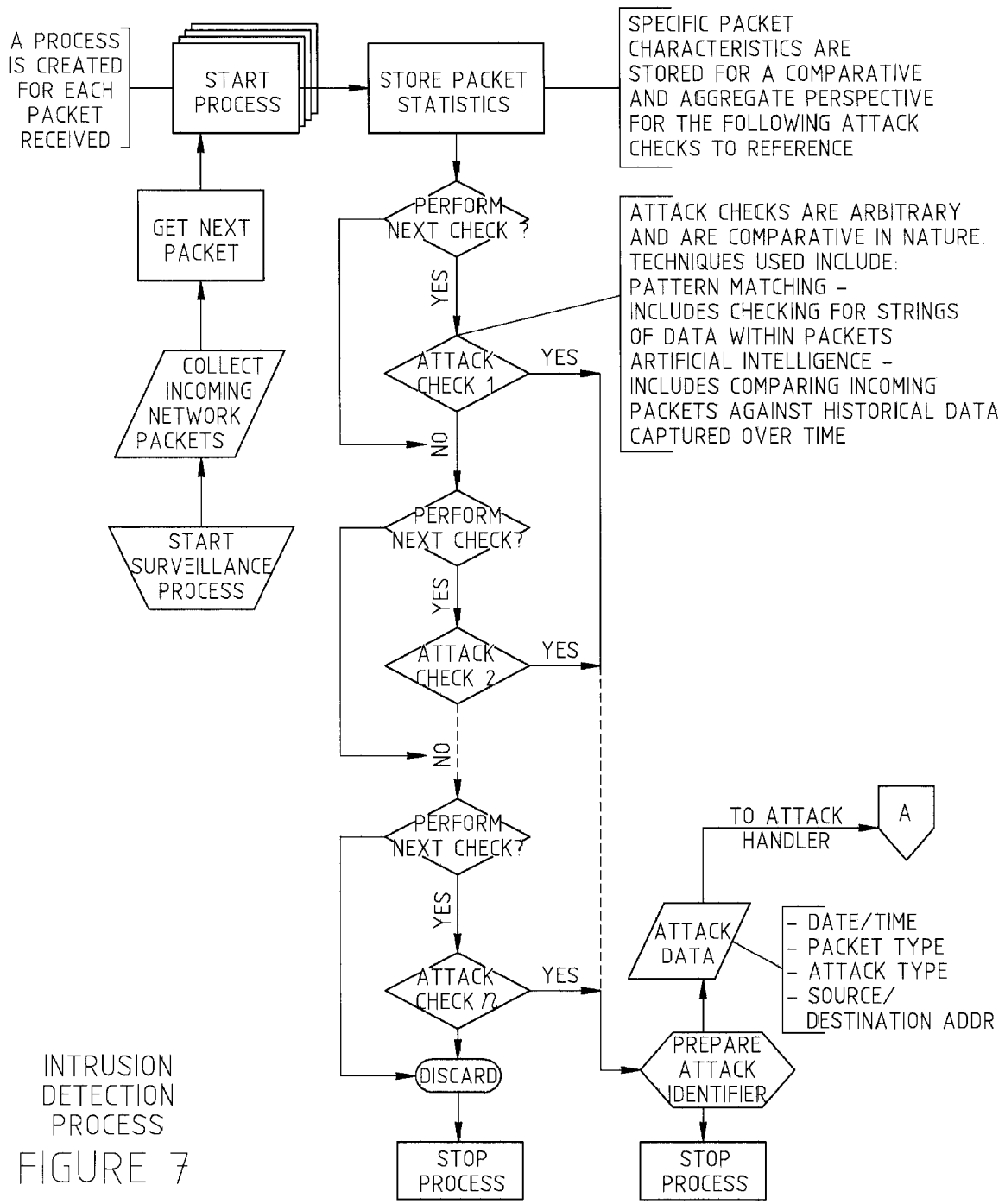
FIG. 7 shows the Intrusion/Detection Process of the System's Intrusion Detection Function.
Figure 8:
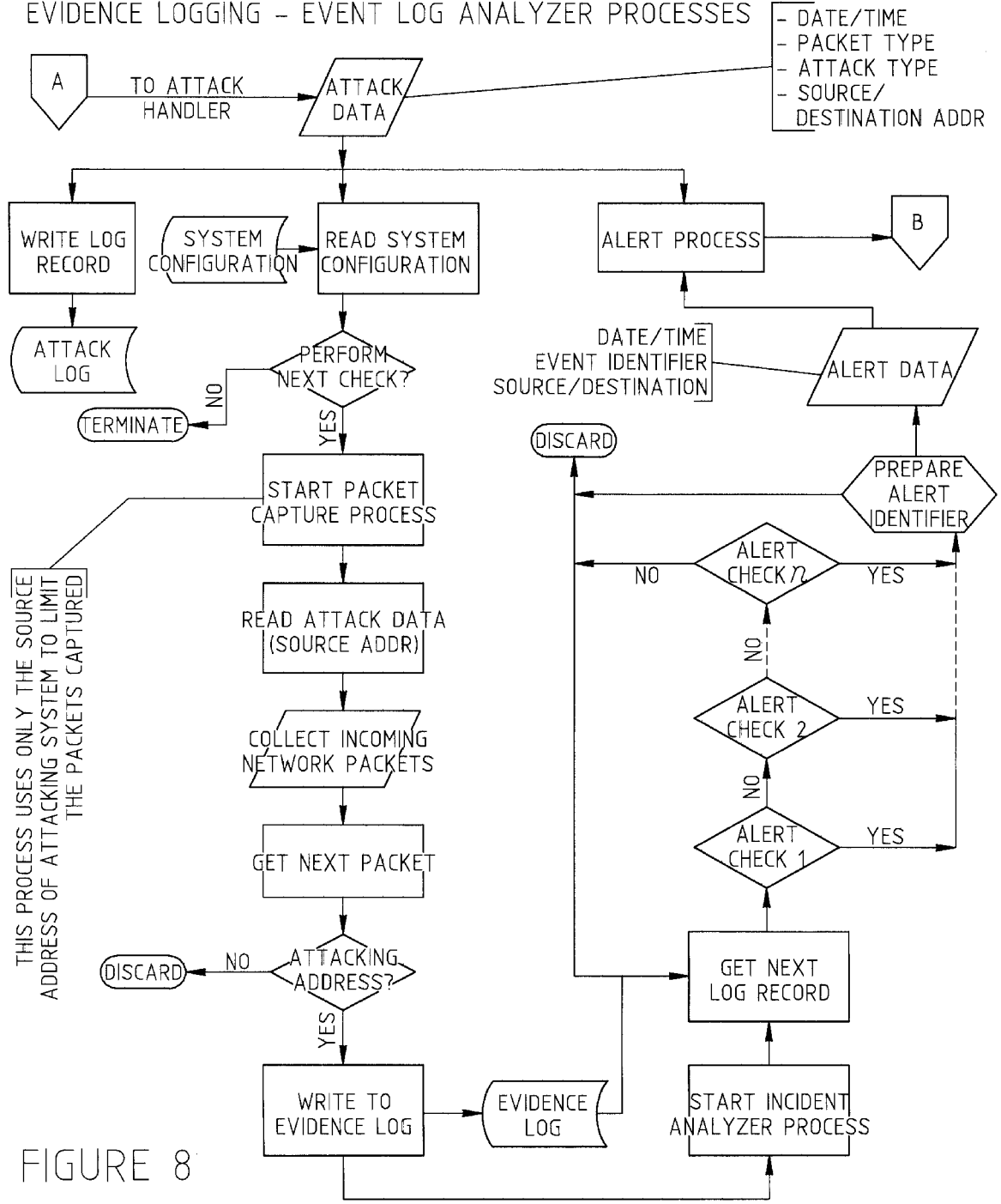
FIG. 8 shows the Evidence Logging and Event Analyzer Process of the System's Evidence Logging and Incident Analyzer/Reporter Functions.
Figure 9:
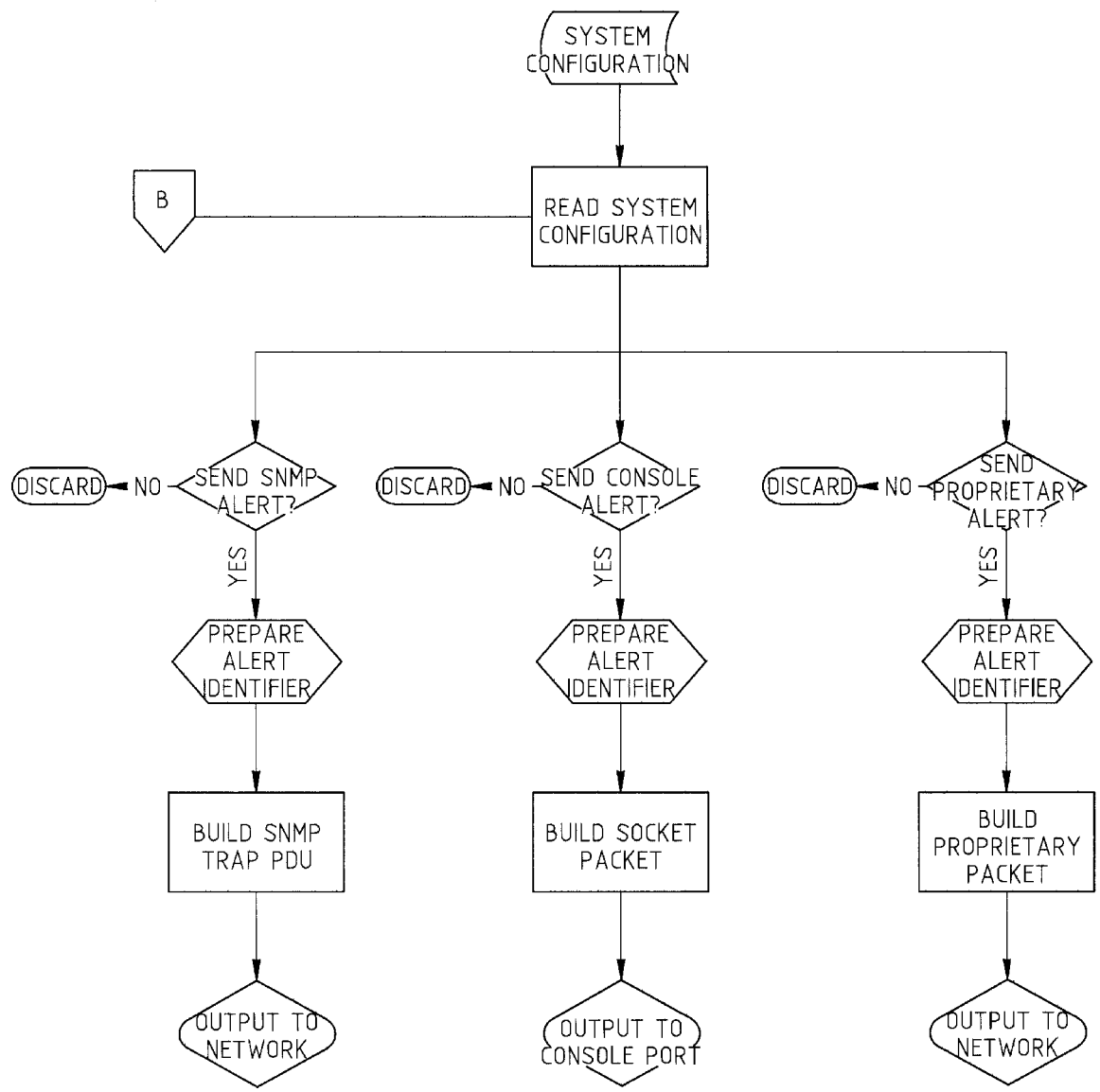
FIG. 9 shows the Alert Notification Process of the System's Alert Notification functions.

The System's method is shown in FIGS. 7, 8, and 9. The Intrusion Detection process is shown in FIG. 7. As shown, once the surveillance process starts and incoming network packets are collected, a process is created for each packet received. The packet's characteristics are stored to provide a comparative, accurate perspective for the following Attack Checks.

As the Attack Checks are comparative, techniques as used in the preferred embodiment include pattern matching, such as checking restraints and vehicle within packets and the use of artificial intelligence for comparing incoming packets against historical data captured over time. If an Attack Check indicates an intrusion, then an Attack Identifier is prepared providing information regarding the time of day, packet type, the attack type, and the source or destination address of the attack and sent to an attack handler shown in the preferred embodiment as the Evidence Logging—Event Log Analyzer Process as shown in FIG. 8.

The Attack Data from the intrusion detection process is then used to prepare a log record, to read the system configuration and to start the Process. Once the system configuration is read, a log is started and the source address of the attacking system or any other identifier as may be appropriate, is used to collect incoming network packets.

The information obtained through the use of the attacking IP address is then provided to the evidence log to accumulate a record of the attacks, for example, identified by a chosen characteristic such as an attacker address or attacked computer address.

The Attack Data from the Intrusion Detection Process, starts the Evidence Logging—Event Log Analyzer Process to provide responsive information to the Alert/Notification Process. This information used with the system configuration information, provides an SNMP alert described above, develops a console alert with its associated alert identifier, and sends a proprietary alert with a proper alert identifier shown in FIG. 8.

As shown in FIG. 8, the Evidence Logging Process is used to provide information to the Alert/Notification analyzer process which, according to the principles of the invention, performs Alert Checks and Prepares Alert Identifiers responsibly to the Process for developing Alert Data indications with, for example, date/time, event identifier, and source/destination information. This information is sent to the Alert Process component, as shown in FIG. 9.

The Alert Notification Process then provides an Alert Message as shown in FIG. 9 and as described above.

As will be interested by those skilled in the art, the principles of this invention are not limited to the methods or systems shown and ascribed in this application but may be used and practiced with other similar methods or system as are known in the art or as may be developed.

We claim:

1. A Network Surveillance System, connected into a data network for transmission of selectively addressed data to respective data processors connected into the data network, said data processors having respective addresses corresponding to the selectively addressed data for selective receipt of the data and processing of the data by said respective data processors comprising:

(a) a network observation means connected into said data network for receiving all of said selectively addressed data transmitted by said data network to said respective data processors;

(b) said network observation means including intrusion detection means connected to said network observation means for examining said received data for an attempted intrusion into said network;

(c) said intrusion detection means including means for providing an event indication, in response to said examining means detecting an attempted intrusion;

(d) alert/notification means responsive to said event indication for providing a message alert of said attempted intrusion;

(e) evidence logging means responsive to said event indication for making a record of said attempted intrusion;

(f) incident analyzing and reporting means responsive to said event indication for providing an identifying indication of said attempted intrusion.

2. A Network Surveillance System, connected into a data network for transmission of selectively addressed data to respective data processors connected into the data network, said data processors having respective addresses corresponding to the selectively addressed data for selective receipt of the data and processing of the data by said respective data processors comprising:

(a) intrusion detection means connected into the data network for receiving all of said data transmitted through the network and for examining said received data for an attempted intrusion into said network and, responsive to detecting an attempted intrusion, providing an event indication; and (b) incident analyzing and reporting means including identifying means responsive to a said event indication, for providing an identifying indication of said attempted intrusion.

3. The system of claim 2, wherein said intrusion detection means provides an event indication of subsequent attempted intrusions and said identifying means includes means for identifying said subsequent attempted intrusions related to said identifying indication.

4. The network surveillance system of claim 2 wherein said means for providing an identifying indication includes means for identifying a data processor related to said attempted intrusion.

5. The network surveillance system of claim 2 wherein said incident analyzing and reporting means includes logging means responsive to said event indication for making a record of said attempted intrusion and for making a record of said subsequent attempted intrusions.

6. The network surveillance system of claim 3 including logging means responsive to said event indication for logging said subsequent attempted intrusions.

7. The network surveillance system of claim 4 including a logging means responsive to said incident analyzer means for recording data from or to said data processor.

8. The network surveillance system of claim 2 including event logging means for creating a log of said event indication.

9. The network surveillance system of claim 3 including means for providing separate respective event indications for said attempted intrusion and said subsequent attempted intrusions.

10. The network surveillance system of claim 6 wherein said step of logging means includes means for creating a separate log file for recording subsequent attempted intrusions related to said identifying event indication.

11. The network surveillance system of claim 10 wherein said separate log file includes means for recording an indication of the date, time, or data related to said attempted intrusion or respective subsequent attempted intrusions, or an indication of a data processor related to said attempted intrusion or respective subsequent attempted intrusions.

12. In a data processing network system having data processors connected to a network for transmitting or receiving data over said network, a network surveillance system for detecting attempted intrusions into the network or into any of the data processors on the network comprising:

a. intrusion detection means connected into a data network for receiving all data transmitted through said network to said data processors and providing an event indication of an attempted intrusion from a data processor;

b. incident analyzing and reporting means for receiving said event indication, and for providing an identifying indication of said data processor, and c. means, responsive to said identifying indication for identifying subsequent attempted intrusions by said data processor.

13. The network surveillance system of claim 12 wherein said intrusion detection means includes means for analyzing said data from said network for specified characteristics and for developing a data base of said specified characteristics of said data.

14. The network surveillance system of claim 13 wherein said intrusion detection means includes means for comparing said data from the network with said data base for and providing said indication of an attempted intrusion in response to said comparison.

15. The system of claim 14 wherein said network surveillance system includes means for establishing a set of normal data in said data base and said means for comparing includes means for comparing said data received from said data network with said normal data in said data base.

16. The system of claim 14 wherein said intrusion detection means including means for providing said event indication in response to said intrusion detection means comparing said data on said network with said set of normal data in said data base.

17. A method for network surveillance of a data network transmitting selectively addressed data to respective data processors connected into the data network and with said data processors having respective addresses corresponding to the selectively addressed data for selective receipt of the data and processing of the data by said respective data processors, comprising the steps of:

(a) network observation of all of said selectively addressed data transmitted by said data network to said respective data processors;

(b) examination of all of said selectively addressed data for detecting an attempted intrusion into said network and, responsive to an attempted intrusion, producing an event indication of an attempted intrusion into said network;

(c) responsive to said step of providing an event indication, the step of alert/notification for providing a message alert of said attempted intrusion;

(d) responsive to said step of providing an event indication, the step of evidence logging for making a record of said event indication;

(f) responsive to said step of providing an event indication the step of incident analyzing and reporting, for providing an identifying indication of said event.

18. A method for network surveillance of a data network for transmitting selectively addressed data to respective data processors connected into the data network, said data processors having respective addresses corresponding to the selectively addressed data for selective receipt of the data and processing of the data by said respective data processors, comprising the steps of:

(a) receiving all of said selectively addressed data transmitted by said data network to said respective data processors;

(b) examining said all of said selectively addressed data for an attempted intrusion into said network and, responsive to an attempted intrusion, providing an event indication of an attempted intrusion into said network; and (c) incident analyzing and reporting said attempted intrusion, responsive to said event indication.

19. The method of claim 18, wherein said step of intrusion detection includes the step of providing an event indication of subsequent attempted intrusions and said step of providing an identifying indication includes the step of identifying said subsequent attempted intrusions related to said identifying indication.

20. The method of claim 18 wherein said step of providing an identifying indication includes the step of identifying a data processor related to said attempted intrusion.

21. The network surveillance method of claim 18 wherein said steps of incident analyzing and reporting includes the step of logging responsive to said step of event indication for making a record of said event indication and for making a record of said subsequent attempted intrusions related to said identifying indication.

22. The network surveillance method of claim 19 including the step of logging said subsequent attempted intrusions related to said identifying indication.

23. The network surveillance method of claim 20 including the step of logging responsive to said step of incident analyzing and reporting for recording data from or to said data processor related to said attempted intrusion.

24. The network surveillance method of claim 18 including the step of event logging for creating a log of said identifying indications of said events.

25. The network surveillance method of claim 19 including the step of providing separate respective event indications, for said attempted intrusions.

26. The network surveillance method of claim 22 wherein said step of logging includes the step of creating a separate log file for recording said attempted intrusion and said subsequent attempted intrusions.

27. The network surveillance method of claim 26 wherein said step of creating a separate log file includes the step of recording an indication of the date, time, or data related to said attempted intrusion or respective subsequent attempted intrusions, or of a data processor related to said attempted intrusion or said subsequent attempted intrusions.

28. A method for network surveillance of a data network for transmitting selectively addressed data to respective data processors connected into the data network, said data processors having respective addresses corresponding to the selectively addressed data for selective receipt of the data and processing of the data by said respective data processors comprising the steps of:

(a) receiving all data transmitted through said data network to said data processors connected into said data network;

(b) examining all said data transmitted through said data network for an attempted intrusion;

(c) providing an event indication of said attempted intrusion from a source data processor;

(d) incident analyzing and reporting responsive to a said step of event indication, for providing an identifying indication of said source data processor; and (e) responsive to said step identifying said source data processor, the step of identifying subsequent attempted intrusions from said source data processor.

29. The network surveillance method of claim 28 wherein said step of intrusion detection includes the step of analyzing said data from said network for specified characteristics and for developing a data base of said specified characteristics of said data.

30. The network surveillance method of claim 29 wherein said step of intrusion detection includes the step of comparing said data from the network with said data base for and providing said indication of an attempted intrusion.

31. The network surveillance method of claim 30 including the step of establishing a set of normal data in said data base and said step of comparing includes the step of comparing said data received from said data network with said normal data in said data base.

32. The network surveillance system of claim 31 wherein said step of intrusion detection includes the step of providing said event indication in response to said intrusion detection means comparing said data on said network with said set of normal data in said data base.

33. A Network Surveillance System, connected into a data network for transmission of selectively addressed data to respective data processors connected into the data network said data processors having respective addresses corresponding to the selectively addressed data for selective receipt of the data and processing of the data by said respective data processors, comprising:

(a) intrusion detection means connected into a data network for receiving all data transmitted through said data network to data processors connected to said data network;

(b) said intrusion detection means including means for examining said data for an attempted intrusion and for providing an event indication of said attempted intrusion;

(c) incident analyzing and reporting means including identifying means responsive to a said event indication, for providing an identifying indication of said attempted intrusion;

(d) and wherein said identifying indication is provided without transmitting any data indicative of the identity of said Network Surveillance System, to said data network.

34. A method for network surveillance of a data network for transmitting selectively addressed data to respective data processors connected into the data network, said data processors having respective addresses corresponding to the selectively addressed data for selective receipt of the data and processing of the data by said respective data processors comprising the steps of:

(a) intrusion detection for examining said received data for an attempted intrusion into said network and, responsive to an attempted intrusion, providing an event indication of an attempted intrusion into said network;

(b) incident analyzing for providing an identifying indication of said event responsive to said step of event indication;

(c) and wherein said step of providing an identifying indication provides said identifying indication without transmitting any identifying data of the Network Surveillance System.

* * * * *